United States Patent [19]

Jones

[11] Patent Number: 4,756,631
[45] Date of Patent: Jul. 12, 1988

[54] DIAMOND BEARING FOR HIGH-SPEED DRAG BITS

[75] Inventor: Kenneth W. Jones, Kingwood, Tex.

[73] Assignee: Smith International, Inc., Newport Beach, Calif.

[21] Appl. No.: 77,266

[22] Filed: Jul. 24, 1987

[51] Int. Cl.⁴ .................. F16C 33/24; E21B 10/22
[52] U.S. Cl. .................. 384/95; 175/329; 384/282; 384/907.1
[58] Field of Search ......... 384/91, 92, 95, 282–285, 384/297, 907.1; 175/329, 371, 410

[56] References Cited

U.S. PATENT DOCUMENTS

| | | | |
|---|---|---|---|
| T102,901 | 4/1983 | Offenbacher | 29/149.5 R |
| 3,823,030 | 7/1974 | Hudson | 384/92 X |
| 3,866,987 | 2/1975 | Garner | 175/371 X |
| 3,879,094 | 4/1975 | Tschirkey et al. | 384/420 |
| 4,029,368 | 6/1977 | Tschirkey et al. | 384/97 |
| 4,190,301 | 2/1980 | Lachonius et al. | 384/95 |
| 4,260,203 | 4/1981 | Garner | 384/96 |
| 4,345,798 | 8/1982 | Cortes | 384/125 |
| 4,468,138 | 8/1984 | Nagel | 384/303 |
| 4,549,820 | 10/1985 | Mullins | 384/91 |
| 4,560,014 | 12/1985 | Geczy | 175/107 |

*Primary Examiner*—Stuart S. Levy
*Assistant Examiner*—Thomas R. Hannon
*Attorney, Agent, or Firm*—Robert G. Upton

[57] ABSTRACT

A bearing for a rotary cone for a rock bit is disclosed. The bearing consists of a multiplicity of small synthetic diamond particles nested within a matrix base, each with an exposed flattened surface to form the bearing. The diamond particles are strategically positioned on a bearing surface and secured within the matrix base. A substantially identical synthetic diamond bearing is concentrically positioned adjacent to the first bearing to form the bearing package.

27 Claims, 3 Drawing Sheets

DIAMOND BEARING FOR HIGH-SPEED DRAG BITS

BACKGROUND OF THE INVENTION

1. Field of the Invention

This invention relates to bearings for rotary cone rock bits.

More particularly, this invention relates to synthetic diamond bearings for rotary cone rock bits. These diamond bearings may take the form of axial, radial or conical bearings and do not require conventional lubricants and attendant seals to function in an earth formation to form a borehole therein.

2. Description of the Prior Art

Diamond material has not been readily used to form bearings between two rotating parts. This is particularly true in roller cone rock bits. U.S. Pat. No. 4,190,301 teaches an axial thrust bearing for a roller drill bit comprising a pair of opposed diamonds. One diamond is mounted in the axial end face of the journal bearing and the other is mounted in the interior of the cutting roller supported for rotation on the journal. Each diamond is mounted on a cup shaped casing made of a softer metal than the journal and cutting roller. This patent differs from the present invention in that it is a single point bearing as opposed to an enlarged curved bearing surface covered with diamond material.

U.S. Pat. No. 4,260,203, entitled "Bearing Structure for a Rotary Rock Bit", is assigned to the same assignee as a present invention. A rotary rock bit is disclosed having bearing surfaces which have extremely long wear resistant properties. The rock bit comprises a plurality of legs extending downwardly from the bit body with cutter cones rotatively mounted on journals cantilevered from each leg of the bit body. One or more engaging bearing surfaces formed between the cone and the journal include a layer of diamond material mounted on a substrate of carbide. In one embodiment the bearing material forms the thrust button adjacent to the spindle located at the end of the journal. In another embodiment the bearing material is located on the inner engaging axial faces of the journal and the cone. In still another embodiment the bearing material is a segmented cylindrical bearing located in a circumferential groove formed in the journal.

While this patent generally teaches the use of diamond material for a bearing it does not specifically point out how the bearing is fabricated between all of the inner engaging rotating surfaces.

U.S. Pat. No. 4,345,798 teaches a means to reduce wear of contacting bearing surfaces. Anti-friction devices or bearings with diamond-containing concretion in the bearing surfaces are lapped before they are used for bearings.

This patent, however, does not teach the use of a multiplicity of small cubical diamond segments strategically placed on a surface to form a bearing.

U.S. Pat. No. 4,468,138 teaches diamond bearings consisting of a supporting plate/ring having a plurality of recesses equally spaced therearound with insert members consisting of hardmetal or carbide studs with planar faces of polycrystalline diamond positioned thereon. The diamond bearing faces are made co-planar by placing soft meltable metal pads in the bottom of each recess before insertion of the bearing studs. The assembly is placed with the bearing faces down on a smooth planar support, followed by heating the assembly to a temperature at which the metal pads melt thus allowing the metal pads to extrude around the base of each insert and thereby brazing the bearing inserts in place. When the assembly has cooled, the bearing inserts have their diamond bearing faces locked in co-planar relation by the extruding metal from the metal pads.

This patent basically teaches a method to mount tungsten carbide studs faced with diamond bearing material within recesses and provides a means to align a diamond bearing surface so that it is co-planar with an adjacent diamond bearing surface.

Finally, U.S. Pat. No. 4,560,014, assigned to the same assignee as the present invention, teaches a bidirectional thrust bearing assembly used between a downhole fluid motor and a rock bit for drilling oil wells. The bearing assembly has a stationary housing with radial journal bearing sleeves and a rotatable driving shaft, also having radial bearing sleeves. A pair of oppositely facing thrust bearing rings are mounted in the housing. A second pair of thrust bearing rings are mounted on the shaft so as to have faces opposing the bearing faces on the first pair of rings. Belleville springs resiliently bias a pair of thrust bearing rings apart and carry the thrust load between such rings. Each ring has a plurality of inserts of hard material, preferably polycrystalline diamond, at the bearing surface. Means are provided for circulating drilling fluid from the motor to the thrust bearing faces forming hydrodynamic fluid bearing films in the bearing faces.

This patent provides a pair of radial thrust bearings that are biased against each other with an intermediate series of Belleville springs. Like the foregoing patent, the diamond bearing package includes a series of polycrystalline diamond studs equidistantly spaced around the circumference of the bearing ring. The patent does not teach the use of a multiplicity of small flat cubic diamond segments bonded to a bearing surface to provide a bearing material.

A number of patents describe the use of hardmetal material for bearings such as rods or buttons. For example, tungsten carbide flush type buttons have been used to provide a bearing surface. The buttons are mounted circumferentially in the same fashion as the foregoing patents '138 and '014. The following U. S. Pat. Nos. 3,879,094, 4,029,368 and 4,549,820, utilize hardmetal tungsten carbide buttons or rods for bearings. U.S. Pat. Nos. 3,879,094 and 4,029,368 are both assigned to the same assignee as the present invention.

None of the foregoing patents teach the use a multiplicity of strategically placed, small, flattened, cubical diamond segments bonded or mounted to the surface of a bearing. A multiplicity of small segments are secured within a matrix to form a bearing that is relatively large in area.

The present invention has a distinct advantage over the foregoing prior art patents by providing a means to utilize diamond material on a bearing surface regardless of the curvature of the surface. Diamonds generally of the same size, with any geometry, may be utilized for a particular bearing application provided at least one surface is flat. For example, natural or synthetic diamond segments may be shaped as triangles, cubes, tetrahedrons or spheres as long as at least one bearing surface is substantially flat. By using small cubical diamond particles and orienting their flats along the curved or flat surface of the bearing, greater surface area can be realized, thus providing more bearing surface; as opposed to utilizing large, circular, widely separated polycrystalline diamond discs mounted within, for example, tungsten carbide substrates.

SUMMARY OF THE INVENTION

It is an object of this invention to provide a diamond bearing material that may be utilized on complex bearing surfaces.

More particularly, it is an object of this invention to provide a multiplicity of cubical diamond segments on a bearing surface, the diamond segments being embedded in a matrix of hard material such as tungsten carbide.

A diamond bearing for a rotary rock bit consists of a main bit body which forms a first pin end and a second cutting end. The bit body further forms a chamber therein which is open to the first pin end. The chamber is utilized to provide a source of coolant through channels formed in the bit body to the bearing surfaces. At least one support means is provided for a rotary cutter that is adjacent the second cutting end of the bit. The support means forms a journal with bearing surfaces thereon. A rotary cutter is mounted on the journal, the rotary cutter also forming bearing surfaces which oppose respective bearing surfaces formed on the journal.

The bearing surfaces have a multiplicity of separated diamond segments strategically positioned on and around the bearing surfaces. Each of the cubical segments form at least one flat surface which is substantially aligned with a surface formed by the bearings. Each of the diamond segments is attached to its respective bearing surface by a metallurgical matrix material bonded to the bearing surfaces. The source of coolant is directed through a passage formed between the bit body and the bearing surfaces to cool the diamond bearing segments during operation of the rotary rock bit in a formation.

The diamond segments are preferably cubical in shape and may be formed on a journal support means and the rotary cutter, each of which forms a plurality of concentric, oppositely opposed axial and cylindrical bearing surfaces.

In addition, the cubical diamond segments may be formed on a journal and a rotary cutter, each of which forms concentric, oppositely opposed conical bearing surfaces.

An advantage then over the prior art is the utilization of relatively small cubical diamond segments embedded in a matrix of tungsten carbide which may be infiltrated with a brazing material such as nickel-silver, nickel-manganese-copper, or chrome-nickel-boron. The small cubical diamond bearings with their flat surfaces oriented parallel with the bearing surface may be formed on complex surfaces which include small diameter journals or conically shaped journals as well as flat surfaces such as radially disposed surfaces.

Yet another advantage of the present invention over the prior art is the very large bearing surfaces provided by utilizing a multiplicity of separated and strategically positioned cubical diamond segments on the surface of a journal. As previously mentioned, state of the art diamond bearings typically utilize large diamond discs mounted to tungsten carbide substrates which, by necessity, are widely separated and which provide a minimum of bearing surface per bearing volume disposed on the journal bearing subsurface.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
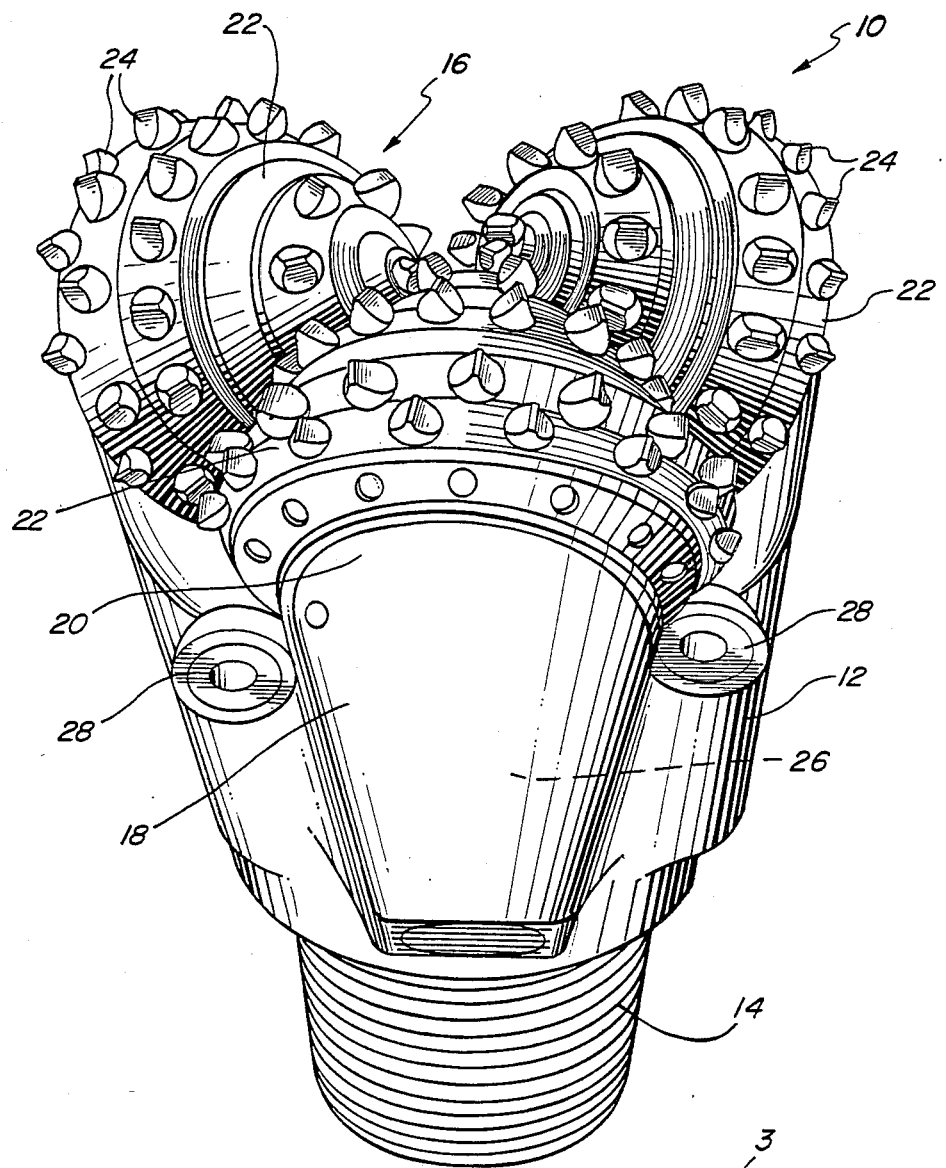
FIG. 1 is a perspective view of a typical three cone rotary rock bit illustrating rotary cutters having tungsten carbide inserts embedded in the cutters.

FIG. 1 illustrates a typical rotary cone rock bit, generally designated as 10, which consists of a rock bit body 12, pin end 14, and a cutting end, generally designated as 16. The cutting end comprises rotatable cutter cones 22 that are attached to a leg portion 18 near shirttail 20. Each of the cones 22 has, for example, a multiplicity of cutter inserts 24 retained by the cone 22. Fluid is directed into pin end 24 into a plenum chamber 26 (not shown) and, from there, the fluid is directed out nozzles 28.

Figure 2:
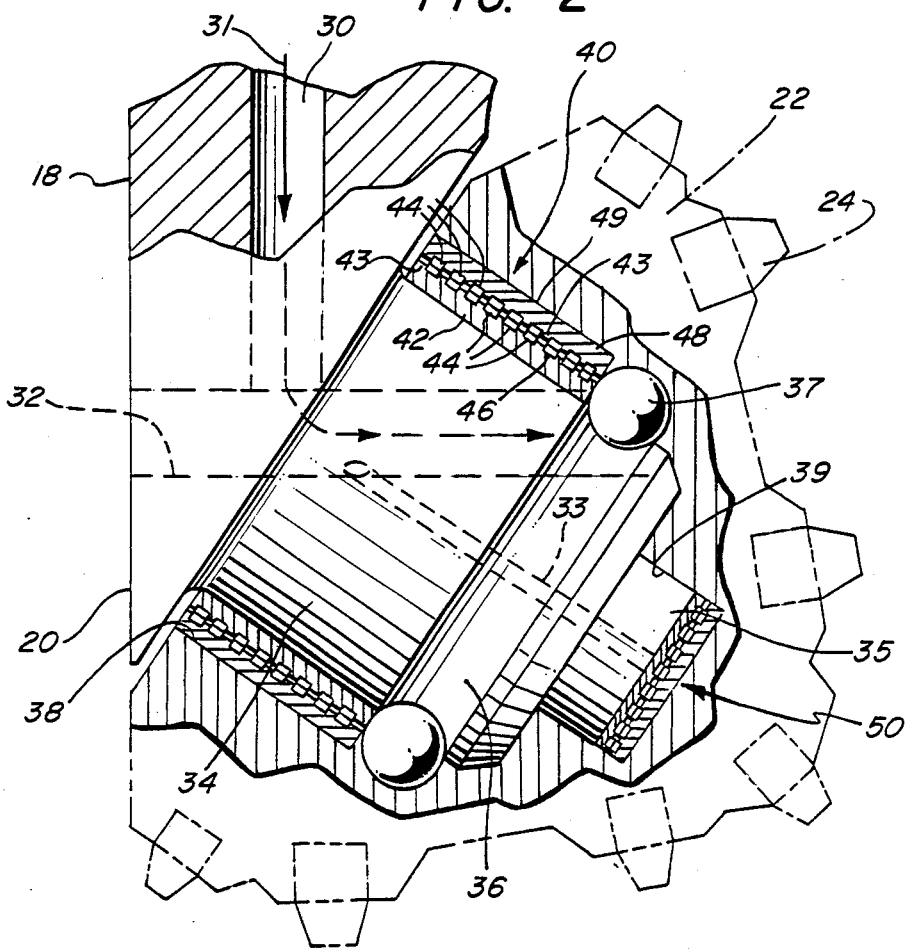
FIG. 2 is a partially cutaway, partially in cross section leg of a rotary cone rock bit illustrating a rotary cone mounted to a journal with bearing surfaces provided between the journal and the cone mouth of the cutter.

Turning now to FIG. 2, the partially cutaway cross section of one leg 18 of the rock bit 10 illustrates a journal bearing 34. The bearing 34 is cantilevered from the shirttail 20 of leg 18. The journal forms a ball race and a spindle 35 extended from the end of the main bearing shaft 34. The cone 22 is assembled over the journal 34 by inserting cone retention balls 37 through ball plug passage 32, thereby rotatably retaining the cone on the journal.

A diamond bearing package, generally designated as 40, consists of inner and outer radial bearing sleeves 42 and 48. The inner sleeve 42 forms an inside diameter surface that is, for example, interference fitted over the outer surface of the journal bearing 34. The sleeves 42 and 48 may be fabricated from a steel alloy, such as 4140 or 4142.

A multiplicity of the preferred cube-shaped diamonds are strategically positioned on the outside surface of sleeve 42 and the inside surface of sleeve 48. One type of diamond cube is known as "MEGAGRIT", and is manufactured by Megadiamond, a wholly owned subsidiary of Smith International, Inc. "MEGAGRIT" is a trademark of Megadiamond which is located in Provo, Utah. "MEGAGRIT" combines wear resistance of diamond and toughness of polycrystalline structure in a thermally stable material. The cube-shaped polycrystalline diamond material is provided in mesh-size cubes and in a variety of grades from 8 to 115 microns. Ordinarily, the cube-shaped material is incorporated into and impregnated with a matrix application at a temperature of, for example, from 1650 degrees Fahrenheit to 2150 degrees Fahrenheit, depending on whether resiliency or rigidness is required for the bearing.

Where a resilient matrix having a low modulus of elasticity is desired, a tungsten carbide binder of nickel-silver is preferred that melts at a temperature of from 1650 to 1700 degrees Fahrenheit.

Where a more rigid matrix having a high modulus of elasticity is desired, a tungsten carbide binder of nickel-manganese-copper is preferred that melts at a temperature of from 2100 to 2150 degrees Fahrenheit. Another binder material for tungsten carbide having a high modulus of elasticity is chrome-nickel-boron.

Figure 8:
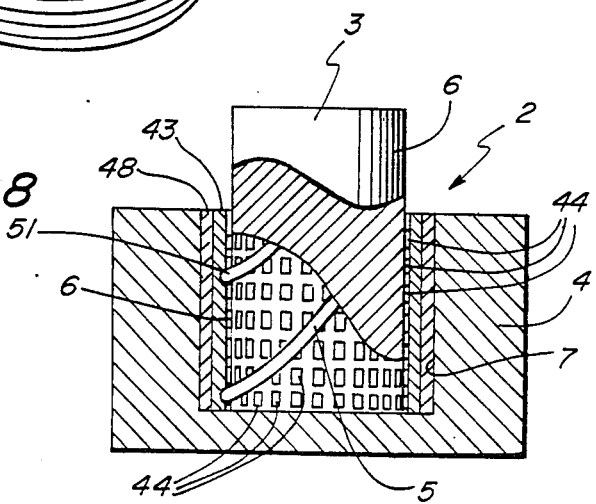
FIG. 8 is a partially cutaway cross-sectional view of a die mold utilized to form cylindrical bearing surfaces of diamond material.

Referring now to FIG. 8, a mold system, generally designated as 2, comprises a female receptacle 4 which is adapted to receive outer radial bearing sleeve 48. A cylindrical mandrel 3 is sized, for example, to the inside diameter of sleeve 48 when the diamonds are in position. The flattened diamond cubes 44 are glued to the outside surface of the mandrel 3 and are strategically positioned on the mandrel to provide maximum bearing surface for the sleeve 48. A spirally shaped ridge 5 protrudes from the surface 6 of mandrel 3. Once the multiplicity of cube diamonds are in position on the mandrel 3, the mandrel is concentrically positioned within the cylindrical cavity 7 of receptacle 4. A matrix granular material of, for example, tungsten carbide, is then poured into the space between the diamonds glued to the mandrel and the inside surface of sleeve 48. The spacing between the cubes is only limited by the physical dimension of the tungsten carbide particles and the necessary porosity therebetween to allow capillary action of the binder material. Sleeve 48, of course, is pressed into the cone mouth 38 after the diamond bearing is formed on the sleeve 48. The tungsten carbide matrix material, once it is in position between the mandrel and the sleeve 48, is infiltrated with, for example, a nickel-silver, nickel-manganese-copper or chrome-nickel-boron binder. The material then is heated to a temperature from 1650 to 2150 degrees Fahrenheit, depending on which of the foregoing binders is mixed with the tungsten carbide, thereby mechanically securing each of the cube diamonds within the matrix. Of course, the diamond flats are perfectly oriented with the surface 6 of mandrel 3, thereby providing a true bearing surface. The spirally oriented groove 45 is also formed in the matrix material to provide a coolant path for fluid. The flange 5, forming the spiral groove, is formed of dissolvable material so that the mandrel 3 may be withdrawn from the interior of the completed bearing sleeve 48 after the curing process is finalized.

Sleeve 42 has its multiplicity of cube diamond bearing material formed on its outer surface in a process similar to that shown in FIG. 8. In this case, the diamond cubes are glued to the inside surface of a mold cavity (not shown). The sleeve is then concentrically positioned within the cavity and the matrix material is poured between the inside diameter of the mold cavity and the outside surface of sleeve 42, thereby mechanically locking the diamond cubes strategically positioned on the inside surface of the mold cavity. Similar spiral grooves 45 are formed in the sleeve 42; the only difference being the spiral groove 45 has its orientation opposite to the spiral groove or flow channel 51 in sleeve 48.

After the diamond is secured to sleeves 42 and 48 by the matrix material 43, the sleeve 42 is, for example, pressed over the journal 34 and the sleeve 48 is pressed into the cone mouth 38 prior to assembly of the cone 22 on the journal 34. The two sleeves may be metallurgically secured to the journal and the cone by, for example, welding.

The cubical diamond segments 44 are sized to conform to a bearing diameter such that when a multiplicity of separated and strategically positioned cubical diamond segments are positioned and attached or secured within the matrix, their multiplicity of flats, when combined around the circumference of the bearing, essentially conform to the curved bearing surface. For example, where the diameter of the bearing shaft is about 2 inches, each of the diamond cubes is about 0.055 inch.

Moreover, the diamond cubes may be placed very close together, limited by the size of the tungsten carbide and the necessity of having enough grains of tungsten carbide between the cubes to allow for sufficient porosity for capillary attraction to assure penetration of the tungsten carbide binder material. For example, the cubes may be as close as 150 microns apart. The cube separation may however range from 150 to 300 microns. The diamond segment separation depends upon the bearing application. The bearing parameters to be considered include the dimension of the bearing, whether the bearing surface is flat or curved and what borehole running conditions to which the bearing will be subjected.

Figure 3:
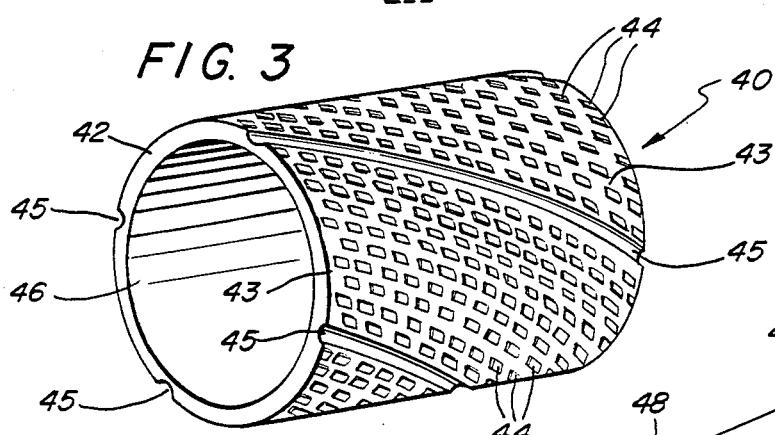
FIG. 3 is a perspective view of a cylindrical sleeve illustrating a multiplicity of cubical diamond segments strategically positioned on the O.D. of the bearing, illustrating a spirally oriented coolant slot from one end of the bearing to the other.
Figure 4:
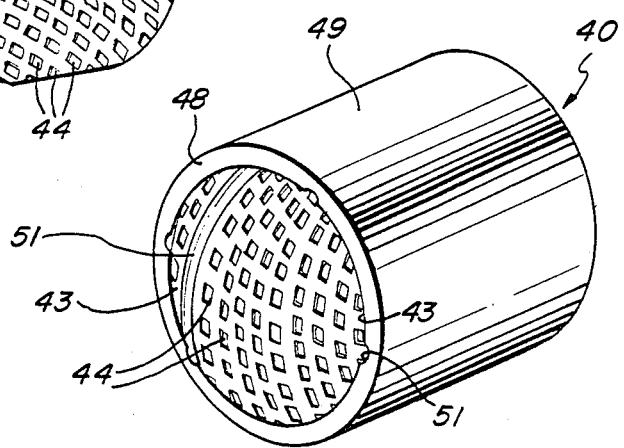
FIG. 4 is a perspective view of a cylindrical bearing having a multiplicity of cubical diamond segments strategially positioned within the I.D. of the bearing, the view further illustrating spirally oriented slots with the spiral direction being opposite to the spiral direction of FIG. 3.

The completed bearing sleeves 42 and 48 are shown in FIGS. 3 and 4, the matrix material 43 mechanically locking each of the cubed diamonds 44 onto the bearing surfaces.

Figure 5:
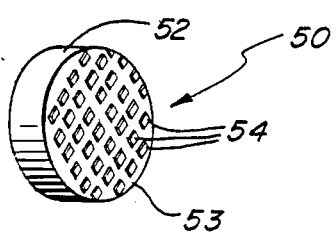
FIG. 5 is a perspective view of a typical radially disposed bearing having its bearing surface formed with a multiplicity of cubical diamond segments strategically positioned on the flat surface.

Turning now to FIG. 5, a radially disposed thrust bearing, generally designated as 50, is disclosed. Disc 52 is fabricated from a base material of, for example, a steel alloy, such as 4140 or 4142. The disc has a multiplicity of diamond cubes 54 strategically positioned on surface 56 of the disc. The diamond segments are secured through a tungsten carbide matrix 53 to surface 56 in a manner similar to sleeves 42 and 48. The disc 52, for example, is secured by welding within spindle cavity 39 formed in cone 22. An identical disc 52 is similarly secured to the end of the spindle 35 extending from journal 34. The radial out thrust of the cone 22 against the spindle 35 is therefore taken up by the diamond bearing, generally designated as 50. A fluid slot may be formed in one or both of the diamond surfaces for cooling and cleaning the axial bearing 50 (not shown).

Figure 6:
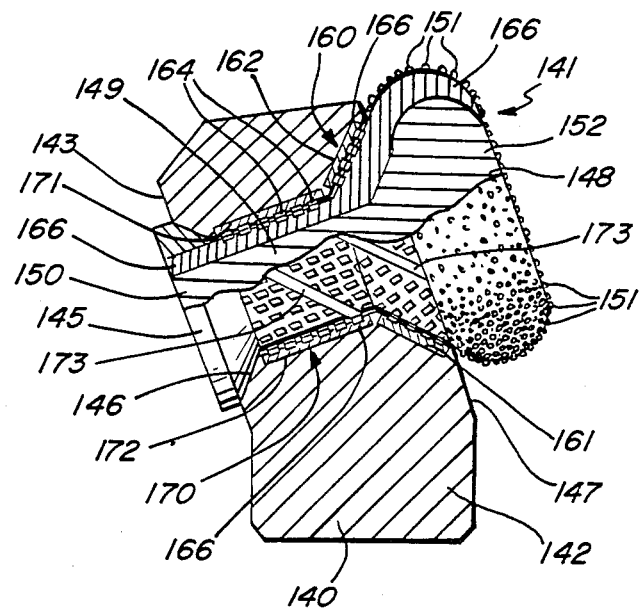
FIG. 6 is a cross section of yet another embodiment wherein a rotary cutter is mounted within a support body, the view further illustrates both conical bearing surfaces and radial bearing surfaces, all of the bearing surfaces having a multiplicity of cubical diamond segments strategically positioned on the bearing surfaces. Spiral slots formed in the bearing surface are provided for cooling of the bearing.
Figure 7:
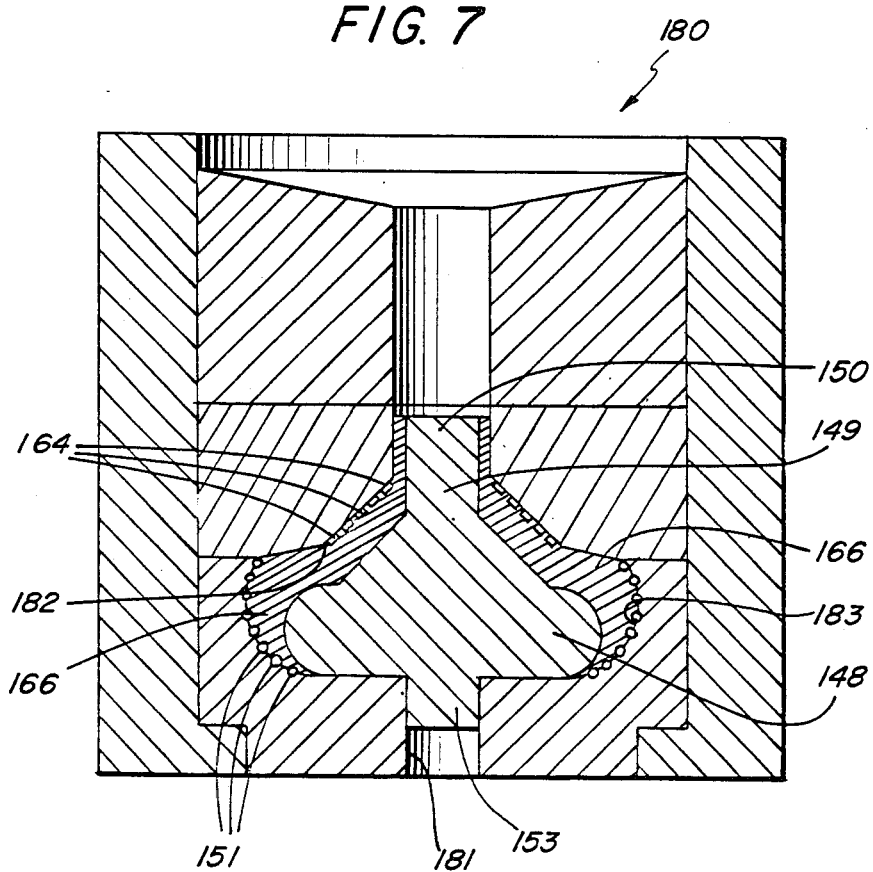
FIG. 7 is a cross-sectional view of a typical die mold utilized to contain a matrix material of tungsten carbide. The diamond segments are glued to the inside wall of the mold prior to heating the matrix which subsequently physically locks each cubical diamond segment to the surface of the matrix.

FIG. 6 illustrates a different type of rotary cutter wherein the cutter element, generally designated as 141, has a toroidally shaped diamond cutting surface 143 at one end of a journal, generally designated as 149. A saddle 142 is provided for journal 149 which provides support for conical bearings, generally designated as 160, and radial bearings, generally designated as 170. Conically shaped opening 161 in bearing block 142 is adapted to receive a conically shaped bearing sleeve 152. A bearing sleeve 172 is pressed into cylindrical opening 171 formed in bearing block 142. The inside diameter of the bearing sleeve 172 has affixed on its surface a multiplicity of diamond cubes 164 mechanically engaged by a matrix material 166. The diamond cubes are strategically positioned on the sleeve 172 in the same manner that the diamond bearings are placed on sleeves 42 and 48 and disc 50 of FIGS. 3, 4 and 5. The toroidally shaped cutting element 141 is fabricated as follows. Referring now to both FIGS. 6 and 7, the steel body 152 of the cutting element 141 consists of end 148, journal 149 and an opposite end 150. The journal 149 with attached head 148 is placed in a mold 180. The steel head 152 forms a removable spindle 153 that is adapted to fit within cylindrical opening 181 in mold 180. An annular cavity is provided between the steel journal 149 and the inside surface 182 of mold 180. Diamond cubes 154 are glued in a strategic manner to surface 182 to provide a conical bearing that complements and mates with conical sleeve 162 fixed within conical opening 161 of support body 142. In addition to the bearing, a multiplicity of diamond cutting elements 151 are positioned within the mold cavity adjacent the toroidal cutting end 148, the diamond cutting elements being glued to surface 183 thus forming the toroidal cutting end of the rotary cutter 141. When all of the diamond bearings 164 and diamond cutters 151 are positioned within the mold 180, the tungsten carbide matrix material is poured into the cavity formed between the steel inner body 149 and the inside diameter 182 and 183 of the mold 180. An infiltrate binder material, such as, nickel-silver, nickel-manganese-copper or chrome-nickel-boron, is placed within the mold. The mold then is fired to a temperature sufficient to infiltrate the binder material, thereby bonding the diamond bearings 164 and the diamond cutting elements 151 within the matrix. The spindle 153 is milled off after the rotary toroidal cutter is removed from the mold 180. A series of spirally oriented channels are formed both on the rotary cutter element 141 and the bearings positioned within the support block 142, the spirals being in opposite directions as heretofore mentioned with respect to FIGS. 3 and 4.

The back side 160 of cutter end 143 is conically shaped and provides a bearing surface which mates against a complementary conical mating surface 144 in the saddle 142. The conical diamond bearing surfaces 160 serve to take the brunt of the thrust from the rotating cutter head 143 during operation of the cutter in a borehole. Similar conically shaped bearing surfaces 146, although they may not be diamond surfaces, are provided. A keeper 145, having complementary conical bearing surfaces, retains rotating cutter 141 within the saddle 142. As mentioned before, the rounded toroid surface 152 of cutter end 148 is covered with embedded natural or synthetic diamonds 151.

With respect now to all of the rotating cutters shown in FIGS. 1 through 7, fluid, such as drilling mud, is directed through the diamond bearing surfaces to cool and clean the diamond bearing surfaces during operation of the cutters within a borehole. For example, in FIG. 2 a fluid 31 is directed through conduit 30 towards opening 32 and from there to the diamond bearings, generally designated as 40. Fluid is also directed through conduit 39 to the disc bearings 50. The drilling fluid circulates between the diamond surfaces and out past the rotating cone 22 adjacent the shirttail 20 and the back inside surface of the cone 22. Thus cooling fluid is circulated through the bearings and out to the exterior of the rock bit. Similarly, with respect to FIG. 6, fluid is directed between the conical and radial bearings and is assured circulation through the bearing packages by the spirally oriented oppositely directed grooves 173 formed in the rotating cutters and their supporting saddles.

The oppositely directed spiral grooves 45, 51 and 173 shown in FIGS. 3, 4 and 6 all serve to assure adequate distribution of coolant fluid through the bearing surfaces so that the bearings remain cool and clean during operation of the cutters in a borehole.

Diamonds generally of the same size, with any geometry, may be utilized for a particular bearing application provided at least one surface is substantially flat. For example, natural or synthetic diamond segments, whether thermally stable or not, may be shaped as triangles, cubes, tetrahedrons or spheres as long as at least one bearing surface is substantially flat.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A diamond bearing for a rotary rock bit comprising:

a main bit body forming a first pin end and a second cutting end, said bit body further forms a chamber therein open to said first pin end to direct a source of coolant through said bit body;

at least one support means for a rotary cutter adjacent said second cutting end of said bit, said support means forming a journal with bearing surfaces thereon;

a rotary cutter mounted on said journal, said rotary cutter forming bearing surfaces opposing respective bearing surfaces formed by said journal; and said bearing surfaces having a multiplicity of separated diamond segments strategically positioned on and around said bearing surfaces, each of said diamond segments having at least one flat surface substantially aligned with a surface formed by said bearings, each of said diamond segments is attached to its respective bearing surface by a matrix material metallurgically bonded to said bearing surface, said source of coolant is directed through a passage formed between said bit body and said bearing surfaces to cool said diamond bearing segments during operation of said rotary rock bit.

2. The invention as set forth in claim 1 wherein said journal formed by said support means for said rotary cutter and said rotary cutter each form a plurality of concentric, oppositely opposed axial and cylindrical bearing surfaces.

3. The invention as set forth in claim 1 wherein said journal formed by said support means for said rotary cutter and said rotary cutter each form concentric, oppositely opposed conical bearing surfaces.

4. The invention as set forth in claim 1 wherein means for cooling is at least one flow channel formed by said first bearing surface.

5. The invention as set forth in claim 4 wherein said at least one flow channel formed by said first bearing surface is spirally oriented along substantially the entire length of said bearing.

6. The invention as set forth in claim 5 wherein a second flow channel is formed by an opposite second bearing surface.

7. The invention as set forth in claim 6 wherein said second flow channel formed by said second bearing surface is spirally oriented along substantially the entire length of said bearing surfaces.

8. The invention as set forth in claim 7 wherein said second spirally oriented flow channel formed by said second bearing surface has its spiral orientation opposite to said spirally oriented flow channel in said first bearing surface.

9. The invention as set forth in claim 1 wherein said diamond segment shapes are selected from a group consisting of triangles, cubes, tetrahedrons and spheres, each segment of which forms at least one flat surface.

10. The invention as set forth in claim 1 wherein said diamond segments are cubical diamond segments having a flat surface substantially aligned with a surface formed by said bearing.

11. The invention as set forth in claim 10 wherein said cubical diamond segments are sized to substantially conform to a bearing diameter such that when a multiplicity of separated and strategically positioned cubical diamond segments are positioned and attached within said matrix their multiplicity of flats, when combined around the circumference of said bearing surface, essentially conform to said curved bearing surface.

12. The invention as set forth in claim 11 wherein when said bearing diameter is about two inches in diameter each of said cubical diamond segments is about 0.055 inches.

13. The invention as set forth in claim 1 wherein said matrix material attaching said diamond segments therein is a tungsten carbide matrix.

14. The invention as set forth in claim 13 wherein said tungsten carbide matrix consists essentially of tungsten carbide particles and a binder of nickel-silver.

15. The invention as set forth in claim 13 wherein said tungsten carbide matrix consists essentially of tungsten carbide particles and a binder of nickel-manganese-copper.

16. The invention as set forth in claim 13 wherein said tungsten carbide matrix consists essentially of tungsten carbide particles and a binder of chrome-nickel-boron.

17. The invention as set forth in claim 16 wherein said multiplicity of strategically positioned cubical diamond segments attached by said matrix are separated one from another by sufficient tungsten carbide particles to provide enough porosity to assure capillary infiltration of said binder.

18. The invention as set forth in claim 17 wherein said matrix separation between said diamond cubes is from 150 to 300 microns.

19. The invention as set forth in claim 1 wherein said diamond segment is synthetic polycrystalline diamond.

20. The invention as set forth in claim 19 wherein said synthetic polycrystalline diamond material is thermally stable.

21. The invention as set forth in claim 1 wherein said diamond segment is natural diamond.

22. A diamond bearing comprising a multiplicity of separated cubical diamond segments strategically positioned on said bearing, each of said cubical diamond segments having a flat surface substantially aligned with a surface formed by said bearing, said cubical diamond segment is attached to said bearing surface by a metallurgical matrix material bonded to said bearing surface.

23. The invention set forth in claim 22 wherein said cubical diamond segment is a thermally stable polycrystalline diamond.

24. The invention as set forth in claim 22 wherein said metallurgical matrix material is comprised essentially of tungsten carbide particles and a binder of nickel-silver.

25. The invention as set forth in claim 22 wherein said metallurgical matrix material is comprised essentially of tungsten carbide particles and a binder of nickel-manganese-copper.

26. The invention as set forth in claim 22 wherein said metallurgical matrix material is comprised essentially of tungsten carbide particles and a binder of chrome-nickel-boron.

27. The invention as set forth in claim 26 wherein each of said strategically positioned cubical diamond segments attached by said matrix is separated, one from the other, by from 150 to 300 microns.

* * * * *